United States Patent [19]

Jorissen

[11] Patent Number: 5,012,897
[45] Date of Patent: May 7, 1991

[54] DEVICE FOR THE CONTINUOUS SUPPLY OF LIQUID OR VISCOUS MEDIUMS, IN PARTICULAR LUBRICANTS

[75] Inventor: Bernd Jorissen, Euerdorf, Fed. Rep. of Germany

[73] Assignee: Gebhard Satzinger GmbH & Co., Bad Kissingen, Fed. Rep. of Germany

[21] Appl. No.: 372,335
[22] PCT Filed: Dec. 12, 1987
[86] PCT No.: PCT/DE87/00592
  § 371 Date: Aug. 7, 1989
  § 102(e) Date: Aug. 7, 1989
[87] PCT Pub. No.: WO88/04751
  PCT Pub. Date: Jun. 30, 1988
[51] Int. Cl.$^5$ .............................................. F16N 11/10
[52] U.S. Cl. ......................................... 184/39; 184/29
[58] Field of Search .................................. 184/29, 39

[56] References Cited

U.S. PATENT DOCUMENTS

| 2,993,948 | 7/1961 | Vaclaw | 136/166 |
|---|---|---|---|
| 3,430,731 | 3/1969 | Satzinger | 184/39 |
| 3,657,021 | 4/1972 | Mathews | 136/173 |
| 3,743,915 | 7/1973 | Struck | 320/2 |
| 3,745,049 | 7/1973 | Kaye | 136/173 |
| 3,945,193 | 3/1976 | Yasuda et al. | 58/238 A |
| 4,671,386 | 6/1987 | Orlitzky | 184/39 |

FOREIGN PATENT DOCUMENTS 0209926 1/1987 United Kingdom .................. 184/39

Primary Examiner—Stephen F. Husar
Assistant Examiner—Alan B. Cariaso
Attorney, Agent, or Firm—Rosen, Dainow & Jacobs

[57] ABSTRACT

The invention concerns a device for the continuous supply of liquid or viscous mediums, in particular of lubricants, and includes a container subdivided by means of a separation device or similar into a chamber for holding the medium and a pressure gas chamber, and a device which can be triggered into action at any time for the electrochemical generation of gas which builds up pressure inside the pressure gas chamber, causing the separation device to expand or shift, which in turn causes the medium to be dispensed. To simplify the design of the device, to make it easier to operate and to allow for retrofitting in a simple manner, at least one compact cell is provided, consisting of an electrolyte, an anode and a cathode, and installed, together with parts of an electric circuit capable of connecting the anode and cathode with one another, inside a single component in which the cell can move, and means are provided which, when the component is inserted into the container lid, cause the cell to be displaced and the electric circuit to be closed.

15 Claims, 2 Drawing Sheets

DEVICE FOR THE CONTINUOUS SUPPLY OF LIQUID OR VISCOUS MEDIUMS, IN PARTICULAR LUBRICANTS

BACKGROUND OF THE INVENTION

1. Field of the Invention

This invention concerns a device for the continuous supply of liquid mediums having varying viscosities, in particular of lubricants.

2. Description of the Related Art

A grease box is known with a closed expandable body and a space filled with lubricant whereby the sealed expandable body contains a device which can be triggered at any monment and consists of a galvanic element for producing gas which builds up pressure in the expandable body where it expands by a certain amount every day and, in doing so, dispenses lubricant via a lubricant channel from a lubricant reservoir to a place in need of lubrication (DE-PS 1256001). It is possible that in the known grease box—if the expandable body is not gas-proof—part of the compresed gas will escape and find its way into the grease container. It is known that this can be avoided by installing a separation device between the expandable body and the lubrication space, which separation device slides along the cylindrical inside wall of the grease box and seals it (DE-PS 2139771).

A common element in these known embodiments is that the sealed expandable body contains an electrolytic liquid in which a corrosive element is inserted by means of a screw to trigger the development of gas. Apart from the fact that the electrolytic liquid requires a large space and involves the danger of leakage and therefore damage to the environment, once the formation of gas has started in these known embodiments, it cannot be stopped or interrupted. It is not possible to replace the electrolyte and/or lubrication containers without destroying the grease box. Similarly, it is not possible to simply add more lubricant to the container.

The purpose of this invention is to simplify the basic design of the known devices, to enlarge the space for the medium to be dispensed in prportion to the gas-generating unit, to make the operation easier, to simplify the regulation of the amount and time involved in the generation of gas, and to allow for easy retrofitting while, at the same time, avoiding the danger of electrolyte leakage.

The use of a compact cell reduces considerably the space requirements for the gas-generating part and eliminates the danger of electrolyte leakage. The insertable component allows not only for the possibility of replacement when the cell is exhausted for the addition of the medium to be dispensed, e.g., the lubricant, but the component also functions, in conjunction with corresponding elements of its counterpart, as a "switch" for starting and stopping the generation of gas without, as a rule, requiring a special switch.

For this purpose the cell is mounted as a moving part in the component and is inserted into the electric circuit by means of, for example, a projection on the container lid against which the cell comes to rest when the component is screwed into place. Consequently, it does not require the introduction of plugs or similar to close the electric circuit.

The secondary claims describe additional measures for the effective execution and further elaboration of the device according to the invention.

For example, the purpose of the measure according to the present invention is to prevent the unintended shifting of the cell in the component. This may involve a spring, or a (spring-loaded) projection with comparable action.

The measure according to the present invention for example, creates in a simple manner a device which triggers the generation of gas when the component is inserted. This may also be achieved—possibly as an additional measure—by means of a switch for the closing of the electric circuit.

To prevent the compressed gas from escaping during a temporary stoppage or interruption of the gas generation, a check valve is provided which also serves to protect the device during transportation until the moment of installation, i.e., in its condition for delivery. Because the gas yield of the compact cell is limited it is possible, according to the present invention to keep part of the water needed for the gas generation outside the cell in a separate space. Accordingly hereinafter, this space can be filled with a water-absorbent mass. Due to the difference in vapor pressure between the cell and the mass—which has preferably an atmospheric pressure which is low but similar to that of the electrolyte—water from the cell can be supplied as needed from the cell to the mass or, in reverse, from the mass to the cell. In addition, the mass offers the advantage of filling a hollow space, thereby reducing the amount of atmospheric oxygen commonly present in hollow spaces. Consequently the cell—which normally when started up uses first the atmospheric oxygen before generating gas—will switch much sooner to its specific purpose, i.e., the generation of gas. To prevent electric transition resistance, additional material may be added to the mass.

The same purpose of increasing the gas yield is also served by the measure described hereinafter, according to which the device is equipped with two or more cells which are insulated from each other upon delivery but are comnnected electrically with one another when the component is inserted into the container lid. For this purpose a switch may be mounted between the cells and/or the switch itself may be designed, according to the present invention, as a flexible spring element separating and insulating the cells electrically before insertion, while allowing them to be electrically connected after insertion. Obviously, the cells may also be switched on or connected to the electric circuit in sequence, i.e., the second cell is activated only when the first one is used up.

Additional especially designed embodiments of the device according to the invention, or individual components are described hereinafter. Of course, the devices, measures and method of connection described therein can be substituted by equivalent devices, measures or methods of connection.

Besides the aforementioned characteristics/advantages of the solution according to the invention, the following is worth mentioning:

The invention is not limited to its use as a grease box, it is also capable of dispensing viscous mediums of another nature.

According to the requirements, cells of various types and capacity may be used. There is also the possibility, as mentioned, of using several cells in one component, which cells may operate simultaneously or in sequence.

As long as the component has not been screwed into place, no gas will be formed. To avoid unexpected triggering during storage or transportation, the bore holding the cell can be closed off with a small cover or similar.

Before delivery, the bore in the container lid may be closed off with a fastening closure which is removed when the unit is put into operation.

To increase and/or accelerate the generation of gas, an additional external power source may be provided.

BRIEF DESCRIPTION OF THE DRAWING

Hereafter, the invention will be described in greater detail with the aid of a preferred embodiment. The drawing shows.

DESCRIPTION OF THE PREFERRED EMBODIMENT

Figure 1:
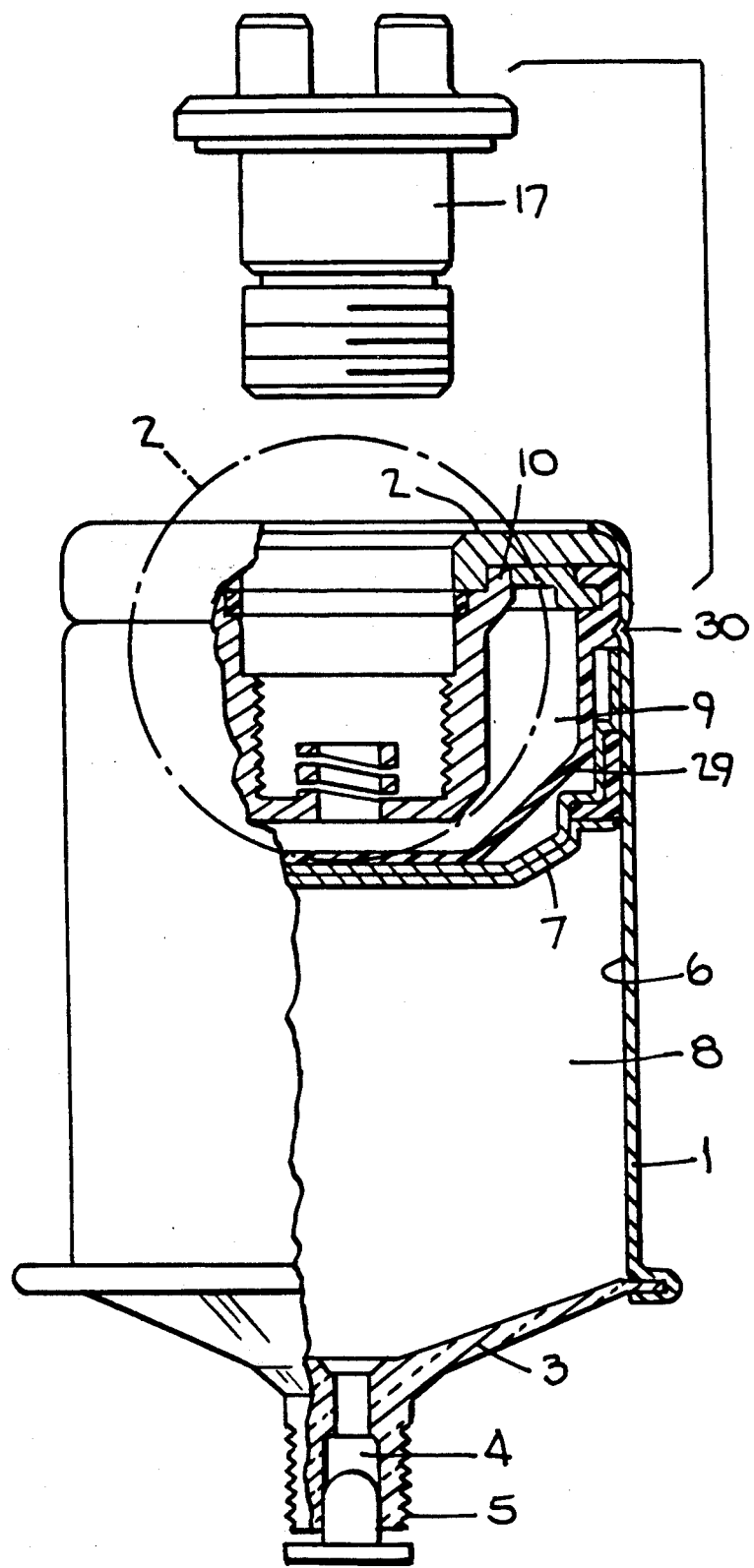
FIG. 1: A partial cross-section of a lubricant dispenser with its essential parts, before operation.
Figure 2:
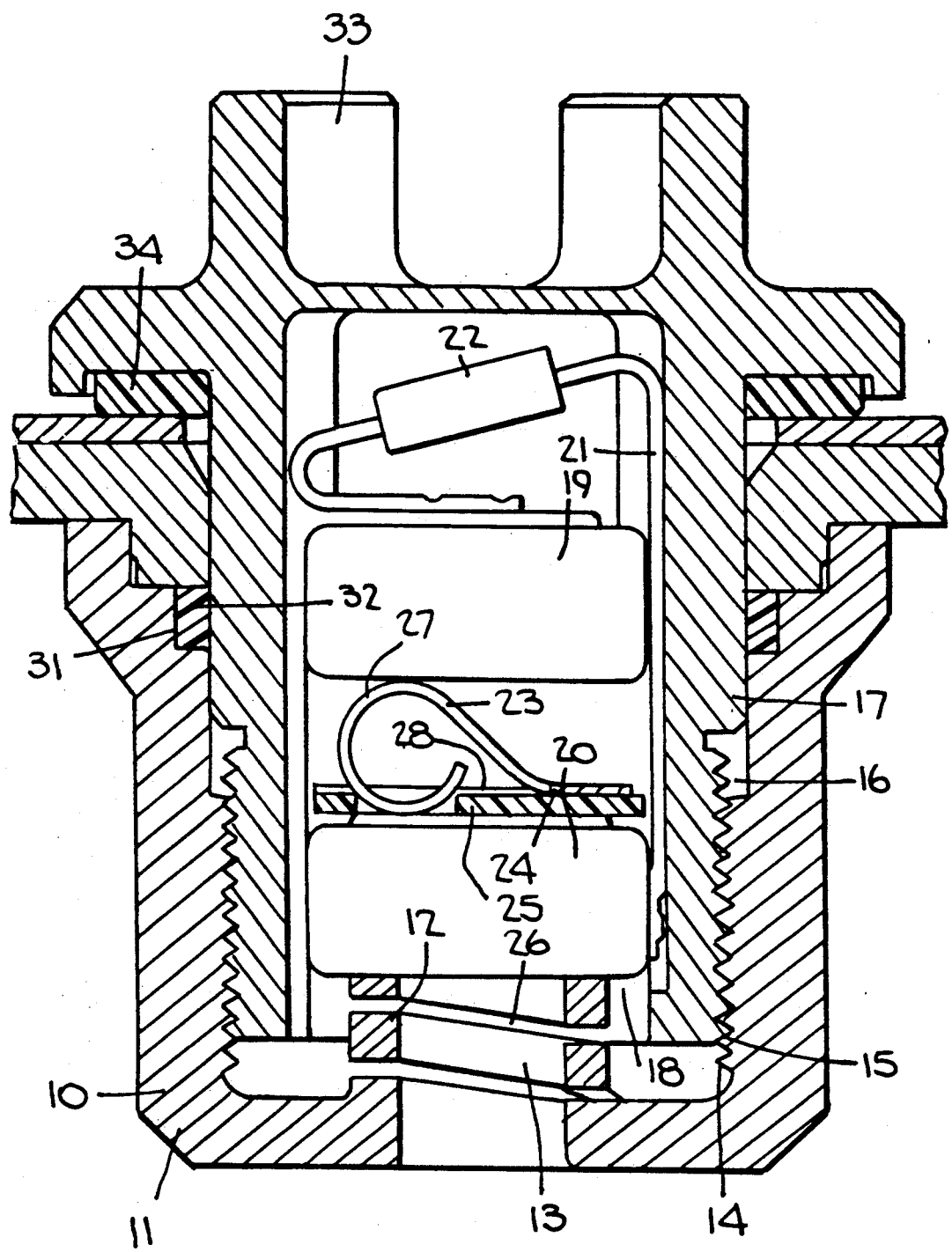
FIG. 2: An enlarged section of the detail marked "X" in FIG. 1 with the component in place, i.e., after operation has started.

The grease box according to FIGS. 1 and 2 consists of a container 1 which is closed on top with a container lid 2 and underneath with a funnel-shaped bottom 3 with an outflow 4, in which funnel-shaped bottom a screw thread 5 has been cut which fastens to a machine part in need of lubrication. The cylindrical bore 6 of the container 1 holds a movable piston 7 which separates the lubricant chamber 8—facing the bottom'—from the pressure gas chamber 9 and which, during operation, pushes the lubricant from the lubricant chamber 8 through the outflow 4 into the machine part in need of lubrication. In this example the container lid 2 is equipped with a bushing-type piece 10 whose bottom 11 is equipped with an outwardly projection part 12 with an access bore 13. The bore 16 of the bushing-type piece 10 is equipped with a female thread 14 to receive a component 17 with a male thread 15, which has a frontal bore 18 across from the projecting part 12. This bore 18 serves to hold two cells 19 and 20, each consisting of an anode, a cathode and an electrolyte for the generation of a gas which can leave the cells and penetrate the compressed gas chamber 9 by way of the access bore 13.

The two cells 19 and 20 are connected with each other by way of a power line 21 containing an external electric resistor 22. Between the two cells 19 and 20, a flexible spring element 23 is installed which pushes the two cells 19 and 20 away from each other in the off position. In the off position the only contact between the spring element 23 and the cell 20 occurs via the strip 24 and the insulating layer 25, so that the electric circuit is not closed and the gas generation does not start.

When the component 17 is screwed into the container lid 2, the projecting part 12—which is designed to be flexible thanks to the screw-like recesses 26—pushes the cell 20 so that the spring element becomes deformed in such manner that its loop-shaped section 27 comes to rest on the surface 28 of the cell 20. As a result, the electric circuit between the two cells 19 and 20 closes and the generation of gas can start (FIG. 2).

As mentioned, the gas generated penetrates the pressure gas chamber 9 via the access bore 13 and—through the expansion of the expansion body 29 which closes off the pressure gas chamber 9—pushes the piston 7 down and, as a result, also pushes the lubricant against the outflow 4 and into the machine part in need of lubrication.

The container 1 may consist of a thin-walled box of sheet metal to which the container lid 2 is attached by crimping; in turn, the lid is attached to the expansion body 29 whose collar 30 forms a seal at the same time. The expansion body 29 constituting the pressure gas chamber 9 is initially filled with a mass which, on the one hand, eliminates the atmospheric oxygen and, on the other hand, contains an additional water supply for the cells.

The bushing-like piece 10 is connected to the container lid 2 in the proper manner, i.e., through bonding, gluing or similar, whereby a snap ring groove 31 cut between both parts combines with a toroidal sealing ring 32 for sealing vis-a-vis the screwed-in component 17. In order to screw the component 17 in the container lid 2 or in the attached piece 10, the component 17 is equipped at its top with a hexagon 33 and other catches for engaging corresponding instruments. A surface seal 34 seals the component 17 vis-a-vis the container lid 2.

The funnel-shaped bottom 3 is made effectively of a transparent synethetic material and is connected in the proper manner with the container 1. The choice of this material makes it possible to check, simply by looking, whether the lubricant chamber 8 still contains lubricant and—based on the position of the piston 7—how much lubricant. The container lid 2 with the piece 10, the piston 7 and the component 17 may be made of a synethetic gas-proof material.

As cells 19 and 20 for the generation of gas, known galvanic cells may be used, i.e., similar to those used for power generation in hearing aids or for the generation of hydrogen or oxygen gases. During transportaion and before the grease box is put into operation, cell 20 in the bore 18 is not yet in cnductive contact with the spring element 23 so that the power circuit is not yet closed. At the place of insertion the container 1 is connected to the machine part to be lubricated, e.g., via a screw thread 5 provided at the funnel-shaped bottom 3. Subsequently, after removal, of the plug for transportation (not shown), the component 17 is screwed into the container lid 2 whereby—as mentionied earlier—the projecting part 12 of the container lid 2 moves—while deforming the spring element 23—cell 20 against cell 19. In doing so, the electrically conductive loop 27 of the spring element 23 comes into contact with the surface of cell 20. As a result, the electric circuit is closed and the gas generation will start.

To interrupt the gas generation the component 12 is turned back until the electrically conductive loop 27 of the spring element 23 is no longer in contact with cell 20 and the electric circuit is interrupted.

The invention is obviously not limited to the embodiment described. Many changes in the construction of the parts are possible. For example, instead of two cells it is possible to use only one, or three, or more. The electrical connection of the circuit of which cell(s) (25) form(s) part can be established in a different manner, e.g., through the incorporation of a switch. It is also possible to leave out the expansion body and/or separation piston, and/or to make the piece 10 into a single item with the container lid 2. To increase the reservoir for the lubricant the piston can also be adapted—when seen in cross-section—to the container lid 2 equipped with the piece 10, so that at the start the pressure gas chamber will be very small.

What is claimed is:

1. A device for the continuous supply of liquid mediums of varying viscosities, including a container and a lid, said container being sub-divided by separation means into a chamber for holding said medium and a chamber for holding a pressure gas, said device being capable of being triggered into action at any time for the electrochemical generation of gas which builds up pressure in said pressure gas chamber, causing said separation means to expand as a function of time, thus causing said medium to travel from said holding chamber via a channel until it is dispensed, characterized by the fact that at least one compact cell comprising of an electrolyte, an anode, and a cathode is provided for the electromechanical generation of said gas, said cell being installed, together with an electric circiut containing an electric resistor connecting said anode and cathode with each other inside a component which is capable of being inserted in said container lid, said cell being capable of moving inside said component and further characterized by when said component is inserted into said container lid, means are provided to cause said cell to be displaced and said electric circuit to be closed for the generation of said gas.

2. Device according to claim 1, characterized by the fact that the cell (19, 20) is placed in the component (17) in a movable position against a resistance.

3. Device according to claim 2, characterized by the fact that means for displacing the cell (19, 20) are provided in the component (17).

4. Device according to claim 3, characterized by the fact that the electric circuit is equipped with a switch.

5. Device according to claim 4, characterized by the fact that the container lid (2) has a check valve.

6. Device according to claim 5, characterized by the fact that an additional water-containing space is available.

7. Device according to claim 6, characterized by the fact that the space is near the pressure gas chamber (9) and contains a water-absorbent mass.

8. Device according to claim 7, characterized by the fact that the bore (18) of the component (17) holds two or more cells (19, 20) which are at first insulated against each other and then, when the component (17) is inserted in the container lid (2), are brought into electrical contact with each other for the closing of the electrical circuit.

9. Device according to claim 8, characterized by the fact that the switch is installed between the cells (19, 20).

10. Device according to claim 9, characterized by the fact that between the cells (19, 20) a flexible spring element (23) is installed which keeps the cells (19, 20) insulated from each other before the component (17) is inserted, but connects them in a conductive fashion after the component has been inserted.

11. Device according to claim 10, characterized by the fact that the container lid (2) has a piece (10) in the shape of a bushing for receiving said component (17).

12. Device according to claim 11, characterized by the fact that the bottom (11) of the bushing-shaped piece (10) is equipped with a projecting part (12) axially directed against the component (17), and an access bore (13) for the gas.

13. Device according to claim 12, characterized by the fact that the projecting part (12), axially directed against the component (17), is designed to be flexible thanks to screw-like recesses (26) or slots.

14. Device according to claim 13, characterized by the fact that the piece (10) in the shape of a bushing is a separate item from the container lid (2) and is connected to it in known manner through bonding or gluing.

15. Device according to the preceeding claim 14, characterized by the fact the component (17) is equiped with means (33) for engaging an instrument for attachment.

* * * * *